United States Patent [19]

Munn

[11] 3,736,509

[45] May 29, 1973

[54] FREE RUNNING PULSE POSITION MODULATION SYSTEM WITH RECEIVER BLANKING

[75] Inventor: Summer T. Munn, Arkport, N.Y.

[73] Assignee: Cunningham Corporation, Honeoye Falls, N.Y.

[22] Filed: June 7, 1971

[21] Appl. No.: 150,315

Related U.S. Application Data

[63] Continuation-in-part of Ser. No. 109,871, Jan. 26, 1971, abandoned.

[52] U.S. Cl. ................325/143, 307/274, 331/107 R, 332/9 T, 178/66, 329/107, 325/320

[51] Int. Cl. ................H03k 4/50

[58] Field of Search ................325/105, 145, 163, 325/320, 349, 143, 141; 178/66 R; 307/233, 271, 283, 274, 273, 293; 331/107 R, 143; 332/9 T, 16 T, 16 R; 329/110, 101, 126

[56] References Cited

UNITED STATES PATENTS

| | | | |
|---|---|---|---|
| 3,164,772 | 1/1965 | Hicks | 325/105 X |
| 3,294,983 | 12/1966 | Draper, Jr. | 307/273 X |
| 3,308,308 | 3/1967 | Bray | 307/293 |
| 3,293,453 | 12/1966 | Abraham | 307/283 |
| 3,466,550 | 9/1969 | Wolf et al. | 325/320 X |
| 3,497,725 | 2/1970 | Lorditch, Jr. | 307/283 X |
| 3,559,083 | 1/1971 | Crouse | 329/107 |

*Primary Examiner*—Benedict V. Safourek
*Attorney*—Morton A. Polster

[57] ABSTRACT

The transmitter pulse is generated by an avalanche device triggered by the voltage developed across a capacitor charged from a constant current source. The timing of transmitter pulses is varied by varying the conductance of a device which shunts the capacitor in accordance with the modulating signal being transmitted. The receiver for the system is blanked, i.e., its input is closed to incoming signals, during intervals of predetermined duration immediately following detection of each transmitted pulse, making the receiver remarkably immune to noise during the intervals between incoming system pulses.

10 Claims, 4 Drawing Figures

SUMNER T. MUNN
INVENTOR.

BY Morton A. Kolter

FREE RUNNING PULSE POSITION MODULATION SYSTEM WITH RECEIVER BLANKING

CROSS-REFERENCES TO RELATED APPLICATIONS

This is a continuation-in-part of application Ser. No. 109,871, filed Jan. 26, 1971 and now abandoned.

BACKGROUND OF THE INVENTION

This invention relates to a novel pulse position modulation (PPM) system for signal transmission in which both the transmitter and the receiver are free-running and not under the control of clocks, and in which a high degree of noise immunization is provided by closing off the receiver input to incoming signals of any kind during the interval between incoming system pulses.

In PPM systems, information is conveyed by varying the intervals between spaced pulses of translated energy. In most well-known PPM systems, transmitter timing circuits provide a series of so-called "modulation frames" separated by forbidden intervals. Pulses are transmitted only during the modulation frames, and it is the relative position of each successive transmitted pulse within its corresponding modulation frame that conveys information. Similarly, the receivers in such systems also include "clocks", i.e., timing circuits similar to those used in the transmitter, which must be synchronized with the transmitter clocks, to gate the receivers ON for periods corresponding to the modulation frames established in the transmitter. Such prior art systems are relatively complex, and many are further complicated by receiver noise-reduction circuits which utilize sophisticated logic and memory components to reject spurious signals received during modulation frame periods.

The prior art relevant to the subject invention also includes a transmitter designed several years ago as part of a remote-control servo system in which a radio-frequency carrier is modulated with digital control pulses. This known servo system uses a variable relation oscillator and/or a variable "one shot" (monostable multivibrator) to vary the timing of transmitted pulses in accordance with servo position information, creating a series of "free-running " pulses at spaced relative intervals. The invention disclosed herein utilizes this general free-running concept as part of an extremely simple and economical PPM system in which position-modulated pulses are transmitted without requiring or using any predetermined series of modulation frames, in which the receiver requires no "synchronized clock" circuitry, and in which a remarkable noise immunity is achieved in the receiver without use of complex logic or memory components.

SUMMARY OF THE INVENTION

Briefly, the transmitter according to the invention includes a triggerable avalanche device through which a capacitor is discharged at varying intervals to generate the desired pulses. The avalanche device is triggered by the voltage across a capacitor which may conveniently be the same one that is discharged to generate the pulses. The timing capacitor is charged from a constant current source and is shunted by a variable conductance device, the conductance of which is varied in accordance with the modulation signal. Thus, during times when the variable conductance device is highly conductive, it shunts a relatively large current and the capacitor is charged relatively slow, providing a relatively long interval between successive pulses. Conversely, when the conductance is low, little or no current is shunted, the timing capacitor is charged rapidly, and successive pulses are closely spaced.

The receiver includes a detector gate in its input signal path which is closed by each received pulse, an interval timer that determines how long the gate remains closed, and a monostable square-wave generator, all of which are triggered in response to incoming system pulses. The input gate circuit closes the receiver to further incoming signals until it is opened by the timer at the expiration of the blanking interval. The monostable multivibrator produces output square waves which have uniform amplitude, a uniform OFF time, and an ON time which varies with the interval between received system pulses. This square wave signal is then simply integrated to demodulate the signal, making the demodulated output highly immune to variations in the amplitude and duration of the pulses received.

The receiver's input gate functions as both a signal detector and as a blanking circuit, and it consists of a single flip-flop in the input signal path of the receiver. This flip-flop gate is SET in response to a received pulse, simultaneously closing the receiver input to incoming signals until it is RESET by the timing circuit.

The system of the invention was developed particularly for use as an intercom system of the so-called "power line" type, in which signals are transmitted over the ordinary electrical wiring in a house or industrial plant. However, the system may be used for many other purposes, such as, for modulating ultrasonic or electromagnetic carrier waves, the latter including the light spectrum as well as the more common radio frequencies.

DETAILED DESCRIPTION

A presently preferred embodiment of the invention will now be described in connection with the accompanying drawings, wherein.

Figure 1:
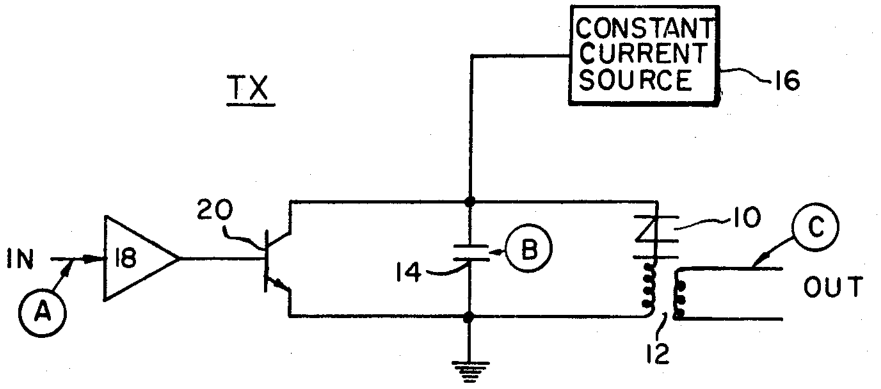
FIG. 1 is a schematic block diagram of a modulator or pulse transmitter according to the invention.
Figure 3:
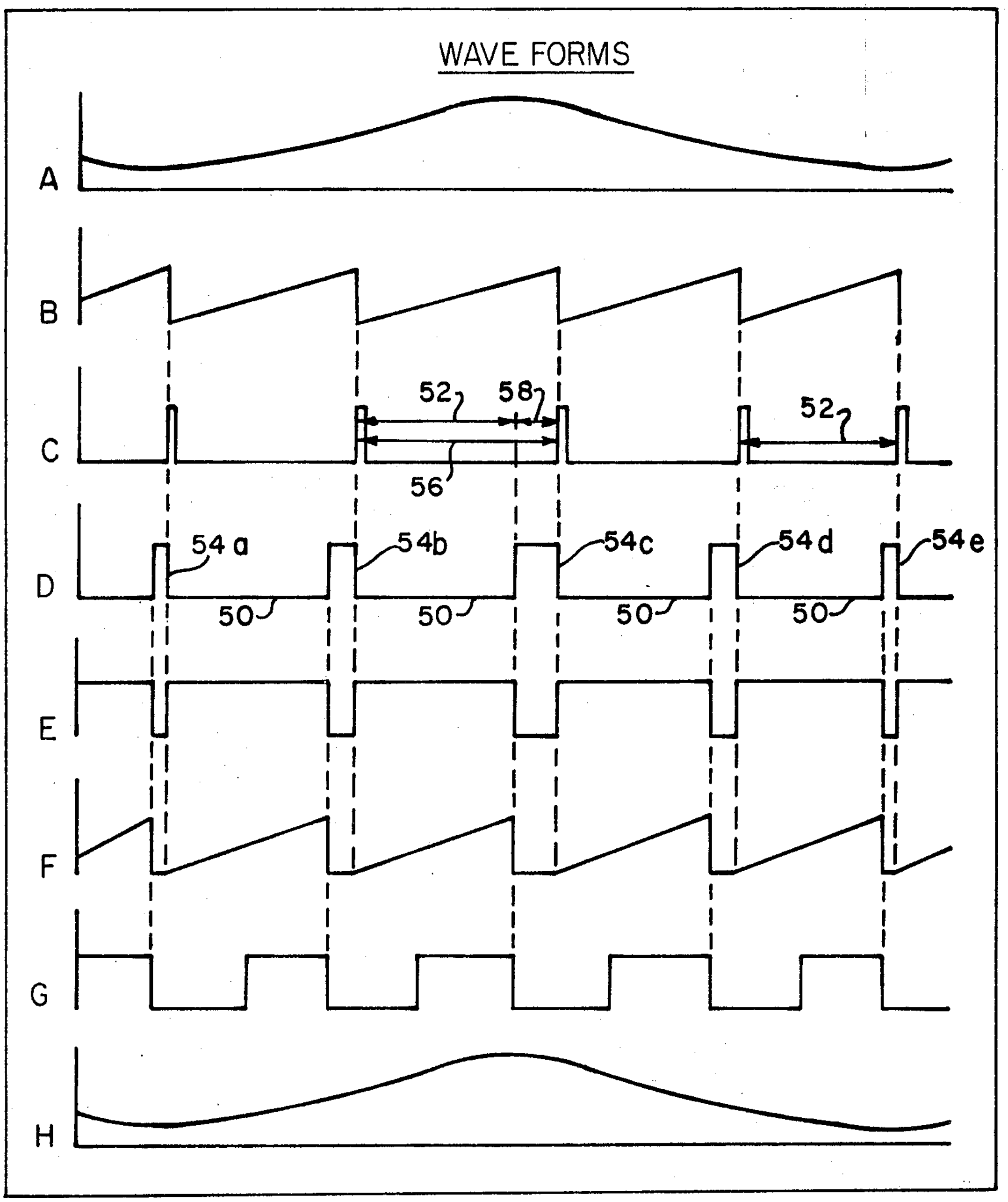

Referring now to FIGS. 1 and 3, a free-running transmitter, or pulse modulator, includes a triggerable avalanche device 10 such as the four-layer diode indicated in the drawing connected in series with an output transformer 12. A capacitor 14 is connected across diode 10 and transformer 12 and in series with a constant current source 16. When the voltage across capacitor 14 reaches the threshold voltage of diode 10, the diode breaks down and capacitor 14 discharges through the diode and transformer 12, producing an output pulse.

The intervals between successive ones of the output pulses (wave form C) are varied in response to an input signal (wave form A) applied through an amplifier 18 to control a transistor 20 which has its collection-to-emitter current path connected in shunt across capacitor 14. When transistor 20 is highly conductive, a substantial part of the current from the source 16 flows through it, and more time is required than otherwise for capacitor 14 to be charged to the threshold voltage of the diode (wave form B).

The modulation can be made to correspond to the input signal with a high degree of linearity. The capacitor 14 is charged to the same voltage for each output pulse, and the exponential nature of its charging rate does not affect the modulation. It is only necessary to design the amplifier 18 in view of the characteristics of the transistor 20 to achieve any desired degree of linearity. So long as the conductivity of transistor 20 corresponds to the input signal, the modulation of the output pulses does also.

The output pulses may be transmitted directly over a pair of wires or, as suggested above, they may be applied to modulate a carrier wave from a radio frequency transmitter, an ultrasonic sound generator or a laser. The nominal, or mid-range repetition rate of the output pulses may be selected in accordance with the designer's choice in view of the bandwidth of the input signal it is desired to transmit.

Figure 2A:
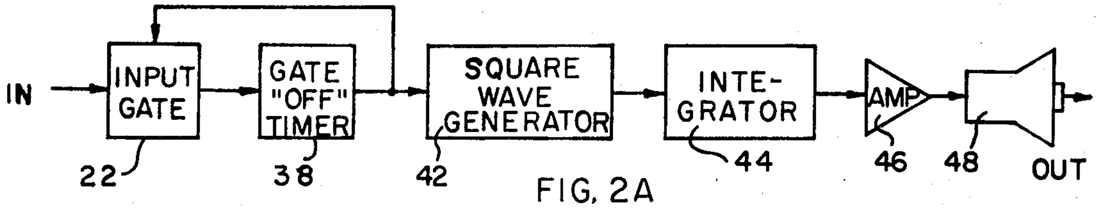
FIGS. 2A and 2B are, respectively, a block diagram and a partial schematic of a demodulator or receiver according to the invention; and, FIG. 3 illustrates wave forms taken at various points in the schematics shown in FIGS. 1 and 2B.
Figure 2B:
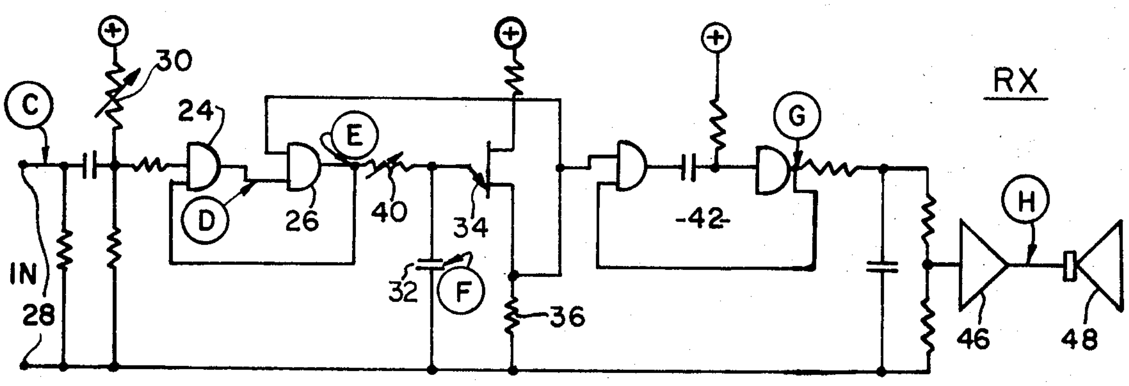

The system receiver will now be described with reference to the block diagram and schematic shown, respectively, in FIGS. 2A and 2B, as well as with reference to the wave forms illustrated in FIG. 3. In instances where pulses are sent by wire from the transmitter to the point of reception, the system receiver comprises only the demodulator shown in FIGS. 2A and 2B. Of course, it will be appreciated that if the pulses are being sent via a carrier wave, they are first extracted from the carrier and then applied at the input terminals of the demodulator. For instance, if the incoming signal consists of short bursts of light energy from a laser diode or similar source, the system receiver would include a light-sensitive device, e.g., a photo-diode, and the pulses sensed by this device would then be applied to the input terminals of the modulator illustrated in FIGS. 2A and 2B.

As noted above, the first stage of the demodulator is an input detector gate 22 which consists of two NAND gates 24 and 26 connected together to form a bi-stable flip-flop. Input gate 22 is SET, i.e., flipped to one of its bi-stable states, by each incoming pulse received at its input terminals 28. A potentiometer 30 functions as an input trigger level control for determining the voltage level necessary to initiate receiver response by triggering NAND gate 24. In this manner, input gate 22 will not be triggered ON by any incoming pulses whose amplitudes are below the level predetermined by the adjustment of potentiometer 30. Because of the novel circuit design of this receiver, it is preferred to set potentiometer 30 to a level very near the peak amplitude of incoming system pulses. In this way, base line noise and most random signals will not affect receiver operation.

After being SET in response to an input pulse, input gate 22 remains set until it is RESET, i.e., triggered to its opposite bi-stable state, by a timer. Setting of flip-flop gate 22 starts the charging of a timing capacitor 32 which is connected to the output terminal of NAND gate 26 and also to the trigger electrode of a unijunction transistor 34. When capacitor 32 reaches the threshold voltage of the unijunction transistor 34, it discharges through transistor 34 and a resistor 36 to produce a RESET pulse which is applied to gate 26 to reset the flip-flop circuit which acts as input gate 22, thereby making input gate 22 once again receptive to incoming pulses. That is, as soon as an incoming pulse is received by gate 22, it switches OFF, and the timing circuit just described controls the duration of this OFF period during which the receiver is blanked, i.e., unreceptive to incoming pulses. This timing circuit (designated in FIG. 2A as GATE "OFF" TIMER 38) includes a variable resistor 40 in series with the charging circuit of timing capacitor 32, and therefore the timing of the blanking interval may be conveniently altered by adjusting the setting of variable resistor 40.

The pulse produced across resistor 36 by the discharge of timing capacitor 32 is also applied simultaneously to a square wave generator 42 which comprises a monostable multivibrator. The monostable square wave generator 42 is SET by each pulse appearing across resistor 36, and following a constant time interval, it is RESET in the well-known manner to await the arrival of the next pulse across resistor 36. It will be appreciated that the time interval during which the monostable generator 42 remains in its SET condition must be less than the smallest interval between successive transmitted pulses. That is, it must be reset fast enough so that it will not miss any transmitted pulses. Preferably, this timing interval is set at approximately one-half the smallest interval expected between successive transmitted pulses.

The output of the square wave generator is passed through an integrating circuit 44 and applied through an amplifier 46 to drive an output transducer such as the loudspeaker 48 shown.

The operation of the system will now be discussed with more particular reference to the wave forms illustrated in FIG. 3 which represent signals appearing at points A through H in the schematic diagrams of FIGS. 1 and 2B. It is assumed that an incoming audio signal A results in transistor 20 drawing progressively less and then progressively more current from constant current source 16, thereby permitting capacitor 14 to charge successively to the threshold voltage of avalanche device 10 at the various rates indicated by the wave form B. As was explained above, each time the voltage across capacitor 14 reaches the threshold of avalanche device 10, the latter fires thereby producing a series of free-running pulses C spaced relative to each other at intervals corresponding to the amplitude of the audio signal A.

These transmitted pulses C are received at the input terminals 28 of the demodulator. The wave forms D and E are taken, respectively, from the outputs of NAND gates 24 and 26 (which together form the flip-flop circuit that acts as input gate 22 of the demodulator). It can be seen that each received system pulse SETS the input gate and initiates the charging of timing capacitor 32 in the manner indicated by wave form F. As indicated above, capacitor 32 charges at a preselected constant rate until it triggers unijunction transistor 34 and discharges through resistor 32 creating a pulse which is used to reset the flip-flop that comprises input gate 22 and, at the same time, to initiate one cycle of operation of square wave generator 42. As described above and as shown by wave form G, the output of the one shot multivibrator which comprises square wave generator 42 is a square wave of uniform amplitude with an OFF time of a predetermined constant interval followed by an ON time which varies with the interval between received system pulses. The integration of this square wave produces an output signal H corresponding in frequency and relative amplitude to the original input signal A.

The system achieves a very high degree of immunity from noise because the receiver is blanked, i.e., its input is closed to all incoming signals, immediately upon the reception of each pulse. This blanking interval is shown as the OFF portion 50 of wave form D and, as noted above, is made equal to or slightly less than the shortest interval 52 between the leading edges of successive system pulses C. As can be seen from ON portions **54*a* and 54*e* of wave form D, when the intervals between system pulses C are relatively brief, the receiver in ON only for very short periods. However, even when it is receiving system signals transmitted at a maximum pulse interval 56, the receiver remains ON only for a relatively short period 54*c* which, as can be seen from wave form C, is approximately equal to the difference 58 between the shortest pulse interval 52 and the longest pulse interval 56**.

Therefore, it will be appreciated that the invention herein improves receiver quieting by a significant factor relative to previously proposed PPM systems in which the receivers are left open during the full duration of each successive modulation frame, being blanked only during the intervals between such equal-timed modulation frames. In the system disclosed herein, the receiver is not left open for any predetermined constant period. To the contrary, it is gated OFF immediately following the receipt of each transmitted pulse. Since, on a time-averaged basis, there will be as many extremely short ON periods **54*a* (wave form D) as there are maximum ON periods 54*c***, the receiver disclosed herein is susceptible to only about one-half of the noise signals that can trouble prior art systems in which the receiver remains ON for the maximum modulation frame period at all times.

As is well known in the art, the length of the maximum difference 58 between pulse intervals affects the ability of the system to distinguish among volume levels of the modulating signals, and this ability is also a function of system stability and quality of its components. Special attention is called to the fact that with some modulating signals, the invention herein has achieved satisfactory results even when the maximum difference between pulse intervals has been reduced to a time period equal to only about four percent of the maximum interval between pulses, allowing the blanking intervals to constitute an average of 98 percent of the operating time of the receiver.

Those skilled in the art will also appreciate that the equipment needed to practice the subject invention is very much simpler and less expensive than that required for prior art systems: there is no clock, either at the transmitter or the receiver, and so no complex circuits are needed to synchronize a clock at the receiver with one at the transmitter; In addition, remarkable receiver quieting and freedom from spurious signals is achieved without sophisticated and expensive logic and memory components.

What is claimed is:

1. A free-running pulse position modulator comprising:

a. a triggerable avalanche device, b. timing means for triggering said device, c. a variable conductance device in shunt with said timing means, d. means for varying the conductivity of said variable conductance device in accordance with an applied electrical signal to vary the current drawn by it and thereby vary the time required for said timing means to trigger said avalanche device, and e. means for producing an output pulse in response to triggering of said avalanche device.

2. A modulator in accordance with claim 1, wherein said avalanche device is a two terminal device, said timing means comprises a capacitor, and the output pulse is produced in response to the discharge of said timing capacitor through said avalanche device.

3. In a free-running pulse position modulation signaling system including means for producing modulated system pulses, a demodulator comprising:

a. a detector for sensing the occurrence of an incoming system pulse, b. gating means responsive to the sensing of an incoming pulse for making the detector insensitive to all incoming variations for a predetermined blanking interval immediately following the sensing of an incoming pulse by said detector, c. means for generating a signal of preselected amplitude and duration in response to the sensing of each incoming pulse by said detector, the duration of each such generated signal being less than said predetermined blanking interval, and d. means for integrating said generated signals to produce an output indicative of the modulation carried by incoming pulses.

4. A demodulator in accordance with claim 3 for use in a pulse position modulation system of the kind in which the variable intervals between successive incoming system pulses have a predetermined minimum value, wherein said detector is made insensitive to incoming variations by said gating means for a predetermined blanking interval approximately equal to said predetermined minimum value.

5. A demodulator in accordance with claim 3 wherein said detector and said gating means comprise a single flip-flop arranged to be set in response to the occurrence of an incoming system pulse and to remain insensitive to incoming variations so long as it remains set, and further comprising an interval timer operative to reset said flip-flop at the end of said predetermined blanking interval.

6. A demodulator according to claim 3 wherein the signal produced by said generating means is a square wave having a duration less than the minimum variable interval between incoming system pulses.

7. A demodulator according to claim 6 wherein said square wave duration is approximately one-half said minimum system pulse interval.

8. A demodulator for a free-running pulse position modulator signaling system of the kind in which there is a predetermined minimum value for the variable intervals between signal pulses, said demodulator comprising:

a. a bi-stable flip-flop for sensing incoming signal pulses and arranged to set in response to a sensed pulse, b. a timer for timing an interval less than said predetermined minimum value of the variable pulse intervals and for resetting said flip-flop at the end of the timed interval, c. a pulse generator for producing a pulse of preselected amplitude and duration in response to said timer at the end of each timed interval, the duration of each produced pulse being less than the duration of said timed interval and d. means for integrating the output of said pulse generator to produce a continuous output signal indicative of the time position modulation carried by the incoming signal pulses.

9. A free-running pulse position modulation signal transmission system comprising:

a. a modulator including means for producing a series of time-spaced signal pulses and means for varying the intervals between successive pairs of the signal pulses in accordance with variations of an input signal without reference to a clock, b. a demodulator, and c. means for transmitting pulses produced by said modulator to said demodulator, d. said demodulator including means for sensing pulses transmitted by said transmitting means, means for generating a pulse of predetermined amplitude and duration in response to each pulse sensed by said sensing means, and means for integrating the generated pulses to produce an output signal generally similar to said input signal.

10. A demodulator in accordance with claim 9 wherein said demodulator includes means for preventing the sensing of incoming signal pulses by said sensing means for a predetermined interval immediately following the sensing of each sensed pulse.

* * * * *